Aug. 30, 1949.  A. RASPET  2,480,263
RESONANT GYROSCOPE ERECTING SYSTEM
Filed Sept. 20, 1944  2 Sheets-Sheet 1

INVENTOR
AUGUST RASPET
BY
ATTORNEYS

INVENTOR
AUGUST RASPET
BY
ATTORNEYS

Patented Aug. 30, 1949

2,480,263

UNITED STATES PATENT OFFICE 2,480,263

RESONANT GYROSCOPE ERECTING SYSTEM

August Raspet, Locust Valley, N. Y., assignor to Specialties, Inc., Locust Valley, N. Y., a corporation of New York Application September 20, 1944, Serial No. 554,934

13 Claims. (Cl. 74—5.44)

1

The present invention relates to vertical axis gyroscopes such as used to provide a stable reference for an air craft or other vehicle and has for an object to provide an improved erector system therefor.

The invention aims to provide an improved erector system having an erector weight movable in a suitable orbit around the axis of the gyroscope and controlled in part by resonant means of a periodicity suitably related to the rate of movement in the orbit so that the weight will dwell, or move slowly, during that portion of its movement at which it causes an erecting precession of the gyroscope and will move rapidly at other portions of its movement.

Another object is to make provision whereby upon occurrence of disturbances affecting the gyroscope such, for example, as the turning of an aircraft on which the gyroscope is mounted, the operation of the erector mechanism can be discontinued.

Another object is to provide an automatic arrangement for rendering the erector system inoperative under certain conditions.

A common and, in many installations, practical erecting system for a vertical spin axis gyroscope is the rotating ball type erector in which one or more balls are driven around the spin axis of the gyroscope, and roll toward the low point during a tilt of the gyroscope so as to introduce an erecting couple which rights the gyroscope. In such ball type erecting systems, the precessing moment is applied to the gyroscope approximately 90° ahead of the low point of the tilt, which is determined by the difference in time required for a ball to move on the uphill portion of this travel as compared to that required for it to roll downhill. As the result of friction between the ball and its track and for other reasons, the phase of the precessional moment exerted by such ball type erecting systems is not exactly 90° ahead of the low position of the track during a tilt and hence the erection is not radial, and the erection characteristics are not accurate in consequence.

The preferred embodiment of the present invention provides an erecting system for vertical spin axis gyroscopes in which the phase of the precessional moment is exactly 90° ahead of the low point of the instrument during a tilt, and this is achieved by substituting a resonant by controlled mass for the rolling ball of the aforementioned system, with consequent elimination of certain errors including the error due to the

2 friction which occurs between the ball and its track in said ball type systems.

More particularly, the preferred embodiment of the erecting system of this invention comprises a rotating mass elastically driven about the vertical axis of the gyroscope at a speed such that the free harmonic period of the elastic drive and the rotating mass coincides with the speed of rotation of the mass, whereby the system will have a point in the trajectory of the rotating mass where the mass rests for a substantial period of its time cycle. By a proper selection of erector speed and elastic drive frequency and conditions, it is possible to maintain the mass for the majority of its time cycle substantially at a point 90° ahead of the low point of the gyroscope during a tilt.

Thus, during a tilt of the gyroscope the mass, which is in effect suspended as a torsion pendulum, tends to swing toward the low point of the tilt, but is controlled by the elastic rotary to take a position 90° ahead of the low point, so as to exert an accurate erecting couple which causes the spin axis to follow a radial path toward true vertical position. Also, because the rotating mass is elastically supported and elastically driven the effects of friction are virtually eliminated and with them the drag which results in the departure of the erection from a radial direction. Furthermore, the resonant erecting system of this invention permits relatively high rotation speed for the mass so that the tendency to coning of the gyroscope axis during erection is reduced to very small angular values. Although the theoretical ideal condition assumes erector rotation speed at exactly the resonant speed of the harmonic period of the elastic drive, the erection characteristics of the system are nevertheless substantially retained if practical considerations require an erector speed somewhat more or less than the harmonic period of the elastic drive. The result is merely that, although the direction of the precessing moment is correct, the erection will not be exactly radial but it will be substantially so.

Operation of the erector system depends upon freedom of oscillation of the torsion pendulum for which reason it can be rendered temporarily inoperative by suitable damping of the pendulum. This is desirable at times as for example during a lateral acceleration of relatively prolonged duration, as when the vehicle, such as an airplane, is executing a turn of such nature that the resultant lateral acceleration is of substantial magnitude. The pendulum mass may be supported so as to respond to gravitational effects of a predetermined magnitude by moving downwardly into damping contact with an abutment so as to cut out the erector system for as long a period as the gravitational effect remains at that magnitude, after which the erector system is automatically restored to activity. Such an automatic cutout is usually preferable to one requiring control by the pilot.

It will be seen that the resonant erecting system of this gyroscope, with or without the automatic cut-out arrangement is extremely simple and effective for securing rapid and accurate erection of a vertical axis gyroscope under all operating conditions, thus making the instrument admirably suited for gun fire control and navigational instruments which are subject to periodic or violent shocks and external disturbances incident to aerial combat, and the like.

For a more complete understanding of the invention, reference may be had to the accompanying drawings, in which.

Figure 1:
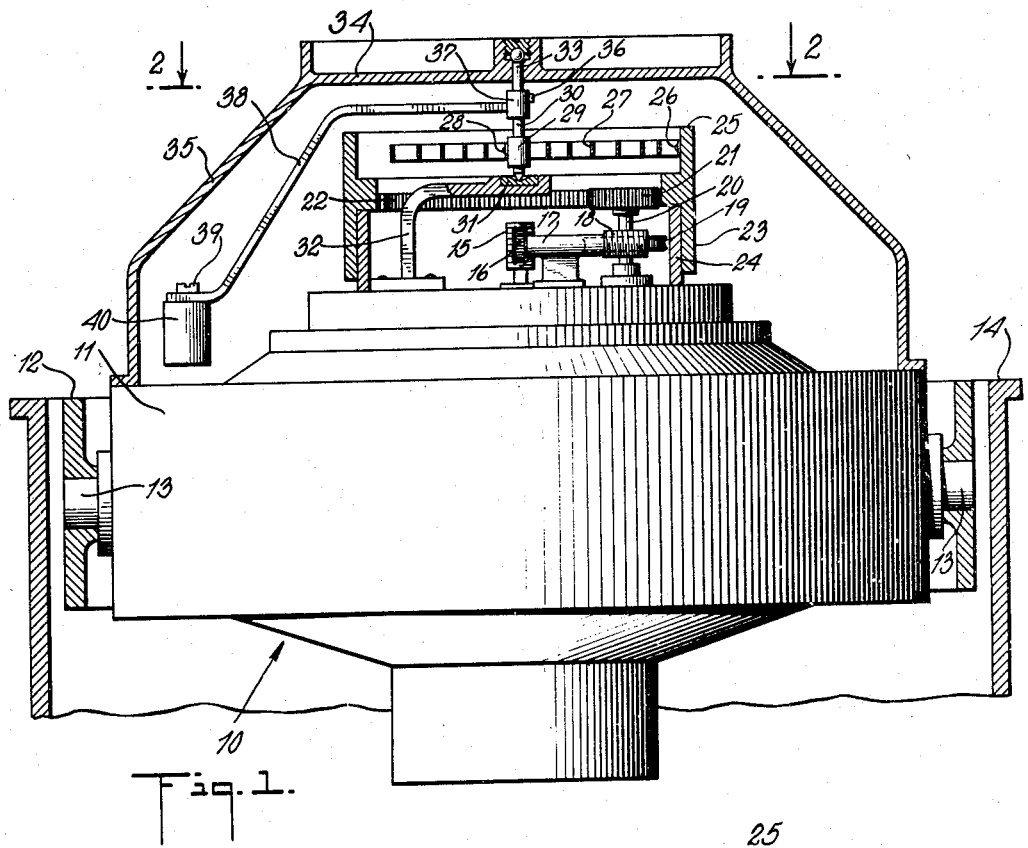
Figure 1 is an elevation, partially in section, of a gyro vertical embodying the resonant erection system of this invention.

Referring to Fig. 1 of the drawing, numeral 10 designates a gyroscope, preferably electrically driven, although it may be air spun, arranged for rotation about a normally vertical axis and mounted in a Cardan suspension for angular movement about two mutually perpendicular horizontal axes normally lying in a plane at right angles to the spin axis, so that the gyroscope has three degrees of freedom. The rotor of the gyroscope 10 is mounted within the casing 11 suspended in the aforementioned Cardan suspension, comprising inner gimbal ring 12 on which the gyroscope casing is pivoted about horizontal axis 13, and the outer gimbal ring 14, which may be a part of the casing of the instrument, on which inner gimbal ring 12 is pivoted about a horizontal axis normal to the plane of the drawing, but not shown.

Figure 2:
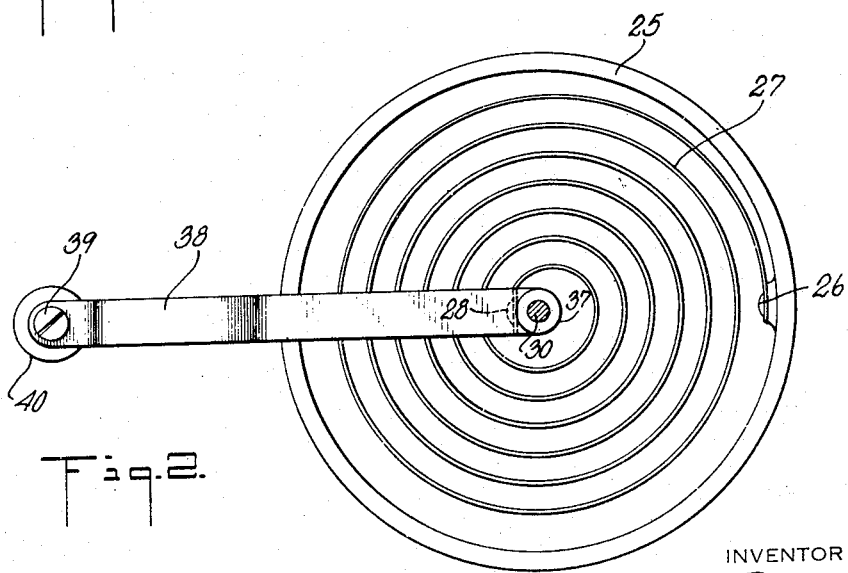
Fig. 2 is a horizontal section through the same and illustrates particularly the elastic drive arrangement of the resonant mass.

As shown in Fig. 2, the shaft of the gyroscope rotor is extended through the top of the casing 11 and carries a worm 15 which meshes with a worm wheel 16 fixed on a horizontal shaft 17 carrying the worm 18, which meshes with the worm wheel 19 on a vertical shaft 20 having a spur pinion 21 at its upper end which meshes with an internal spur ring gear 22. The gearing just described constitutes reduction gearing whereby the internal ring gear 22 is driven at a rate less than the high spin rate of the gyroscope rotor, and determined as will be described. Ring gear 22 is mounted on or formed in a drum 23 which is journalled on a tubular axial extension 24 on the casing 11 of the gyroscope. This driven drum 23 is provided with an upwardly extending circular flange 25, to the interior of which is secured by a screw 26 or other suitable means, one end of a spiral spring 27, similar to a hair spring, whose other end is secured by screw 28 to a hub 29 fixed on a short vertical shaft 30 coaxial with the gyroscope axis. The shaft 30 is anti-frictionally journalled at its lower end in a jewel 31 or other bearing mounted on a stationary bracket 32 secured to the gyroscope casing 11. The upper end 33 of the shaft 30 is anti-frictionally journalled in the top 34 of a hood 35 enclosing the erector system and mounted on the gyroscope casing 11.

Fixed to the shaft 30 by means of a set-screw 36 is a sleeve 37 carrying a downwardly depending substantially rigid strip or arm 38 having a weight 40 of predetermined mass connected to its free end by a screw 39. Being fixedly mounted on drive shaft 30, the arm 38 and weight 40 are driven around the axis of the gyroscope 10, through spring 27 having predetermined stiffness and period of oscillation.

The weight 40 with its support and control spring 27 constitute a torsion pendulum the period of oscillation of which can be made to suit the requirements of the apparatus. If the oscillation frequency and amplitude of the pendulum and the speed of rotation of the shaft are in suitable harmonic relation acceptable erection by precession is obtained. In some circumstances most satisfactory operation is obtained if the torsion pendulum is designed for a natural amplitude of 180° and a frequency of double oscillation equal to the speed of rotation of the shaft 30. In such an arrangement the weight dwells during about one half of each revolution practically at a point 90° in advance of the low point of its orbit and moves very rapidly in a complete circle during the other half revolution. Moderate variation of speed of rotation will shift the phase slightly from the 90° position but without any significant effect upon the operation of the erector system. For best operation shaft 30 should be accurately parallel to the gyroscope axis and usually it is in line therewith as shown.

In operation of the resonant erecting system particularly illustrated in Figs. 1 and 2, the shaft 30, on which the weight 40 is supported, is driven about the axis of the gyroscope through the elastic connection afforded by the spiral spring 27 which is interposed between the rotating drum 23 and shaft 30. During a tilt of the gyroscope, weight 40 tends to swing by gravity toward the low point of the tilt, and to oscillate, within the limits afforded by the spiral spring 27 as a torsion pendulum. However, the speed of rotation of shaft 30 and the characteristics of the elastic connection provided by spiral spring 27 are selected so that the free harmonic period of the elastic connection and the revolving weight 40 acting as a torsion pendulum coincides with the speed of revolution of the weight 40, resulting in the erector system having a point on the trajectory of the revolving weight 40 where the latter remains for a major portion of the cycle. By suitable selection of erector speed and elastic connection frequency, the weight 40 is positioned during about one half of its time cycle practically at a point 90° ahead of the low point of the gyroscope during the tilt so that true radial erection is rapidly achieved. In other words, the weight 40 is periodically arrested or restrained at an angle ahead of the low point.

The speed of rotation of shaft 30 and of the associated parts of the erector mechanism is limited only by practical considerations and especially by the possible frequency of oscillation of the torsion pendulum. Obviously the torsion pendulum cannot be connected directly to the gyroscope rotor shaft unless the torsion pendulum is designed for a corresponding frequency or at least for a suitable subharmonic frequency.

It is desirable to cut out the erection during certain maneuvers such as turning in order to prevent the erection by the system on the resultant acceleration vector. The direction of the resultant acceleration is given by $$\sin\theta = \frac{a}{\sqrt{a^2+g^2}}$$

in which $\theta$ is the angle of the turn, $a$, the acceleration and $g$, gravity. Accordingly, the cut-out system may be provided for erection system of Fig. 1 so as to be sensitive to the magnitude of the resultant acceleration rather than to its direction so as to be insensitive to easy turns or turns of short duration.

Figure 3:
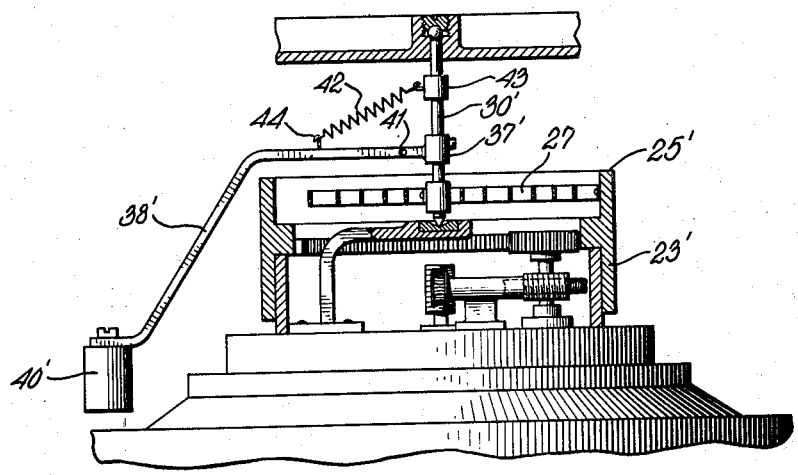
Fig. 3 illustrates the arrangement whereby the erector system is automatically rendered inactive or cut-out during periods of prolonged disturbance of a predetermined magnitude.

One form of such cut-out arrangement is illustrated in Fig. 3. The weight 40' is driven as before through the spiral spring 27', but the arm or strap 38' supporting the weight 40' is hinged for vertical movement at 41 relatively to the sleeve 37' fixed to the elastically driven shaft 30'. A coil spring 42 connected at one end 43 to the shaft 30' and at the other end to a hook 44 on the strap or arm 38', normally holds the latter out of contact with the upper edge of the flange 25' of the driven drum 23'. The torsional pendulum provided by the arm 38', weight 40', and elastic drive 27' is accordingly elastically suspended radially and the mass 40' is subject to downward deflection under gravitational force of predetermined magnitude, so that arm 38' engages flange 25', thus cutting out spiral spring 27', which accordingly disables the erector system as a whole.

The tension of supporting spring 42 is selected so that the weight 40' is not responsive to accelerations which are considered normal, say less than one tenth of a gravity unit, but is responsive to accelerations which exceed one gravity unit by a small chosen fraction, so that arm 38' is deflected downwardly by mass 40' to engage flange 25' and thus cut out the erecting system in the manner described. In other words, damping is introduced which causes the erection to be cut out. Thus by adjusting spring 42 so that cut-out occurs in response to an acceleration, say 1.1 g. as in the example given, the erecting system will be damped in the manner described during certain wide or sustained turns of the vehicle. When the turn subsides, spring 42 restores the erector system into operation.

Alternatively, the strap or arm 38 of Fig. 1 may be made of spring steel of a stiffness such as to flex into engagement with flange 25, when weight 40 responds to a predetermined gravity value such as a 1.1 g., for example, thus dispensing with the hinge 41 and spring 42 of Fig. 3.

Figure 4:
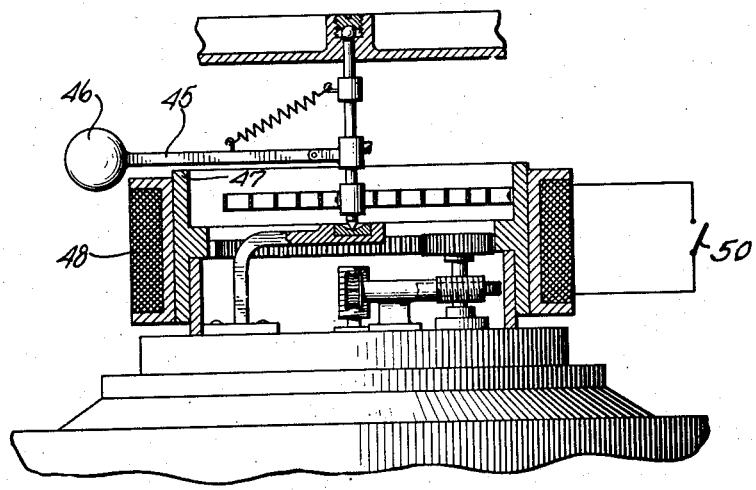
Fig. 4 illustrates another embodiment of the invention in which the erector system is rendered inactive under manual control.

In Fig. 4 is shown a modification wherein the erector mechanism is made inoperative at the will of the pilot. As shown the arm 45 carrying the mass 46 swings above the flange 47 as in the other embodiment of the invention. An electromagnet 48 is arranged to be energized by manually closing its circuit by switch 50 and the arm 45 is thereby drawn into sufficient frictional contact with the flange 47 to interfere with its free rotation and to destroy its resonant action.

Although certain preferred embodiments of the invention have been illustrated and described herein, the invention is not limited thereby but is susceptible of changes in form and detail within the scope of the appended claims.

I claim:

1. In an erector system for vertical axis gyroscopes, the combination of a pendular weight, mechanism for driving said weight around the axis of said gyroscope in a plane normal to said axis, and elastic means in said mechanism with which gravity coacts to cause the weight to dwell at a predetermined angle ahead of the low point of the tilt of the gyroscope from the vertical, whereby the weight exerts a moment on the gyroscope causing the same to precess substantially radially to the vertical position.

2. In an erector system for vertical axis gyroscopes, the combination of a pendular weight displaced from the axis of said gyroscope, a pivot for said weight about the axis of said gyroscope, a driving connection between the rotor of said gyroscope and said weight, and elastic means interposed in said connection and having an harmonic period of oscillation substantially equal to the period of rotation of said weight about said axis, whereby the gravitational swing of said weight toward the low point of a tilt of said gyroscope from the vertical is limited by said elastic means to a predetermined angle ahead of said low point.

3. In an erector system for vertical axis gyroscopes, the combination of a weight displaced from the axis of said gyroscope, means constraining said weight for movement about the axis of said gyroscope, elastic means restraining the pendular swing of said weight about said axis during a tilt of said gyroscope, and means for driving said weight about said axis at a speed substantially equal to the resonant speed of the harmonic period of said elastic means, whereby the weight swings to a predetermined relative position ahead of the low point of the tilt of said gyroscope for exerting an erecting couple thereon.

4. In an erector system for vertical axis gyroscopes, the combination of a weight displaced from the axis of said gyroscope, means constraining said weight for movement about the axis of said gyroscope, elastic means restraining the pendular swing of said weight about said axis during a tilt of said gyroscope, and means for driving said weight from the rotor of said gyroscope through said elastic connection about said axis at a speed substantially equal to the resonant speed of the harmonic period of said elastic means, whereby the weight swings to a predetermined relative position ahead of the low point of the tilt of said gyroscope for exerting an erecting couple thereon.

5. In an erector system for vertical axis gyroscopes, the combination of a pendular weight displaced from the axis of said gyroscope, an arm suspending said weight, a shaft coaxial with said gyroscope axis carrying said arm and weight for pendular movement about the axis of said gyroscope, a drive from the rotor of said gyroscope, and an elastic connection interposed between said shaft and said drive having a period of oscillation when the gyroscope axis is inclined to the vertical such that the dwell in rotation of the pendular weight on successive pendular movements will be at substantially the same point of rotation.

6. In an erector system for vertical axis gyroscopes, the combination of a weight displaced from the axis of said gyroscope, vertically flexible means constraining said weight for movement about the axis of said gyroscope, a driving connection between said weight and the rotor of said gyroscope for driving the weight in one direction around said axis including an elastic connection having a period of oscillation substantially equal to the period of rotation of said driving connection, an abutment on said gyroscope spaced from said first means, and means responsive to a predetermined force substantially parallel to the axis of said gyroscope for flexing said first means into engagement with said abutment for damping the movement of said weight, whereby the erecting function of said weight is inhibited.

7. In a vertical axis system for vertical reference gyroscopes, the combination of a pendular weight displaced from the axis of said gyroscope, an arm suspending said weight, a shaft carrying said arm and weight for pendular movement in a plane normal to the axis of said gyroscope, a reduction gear driven from the rotor of said gyroscope and an elastic spring connection interposed between said arm and said drive having a period of oscillation substantially equal to the period of rotation of said shaft.

8. An erector system for vertical axis gyroscopes as defined in claim 3 including means responsive to a predetermined force substantially parallel to the axis of the gyroscope for damping the movement of the weight whereby the erecting function of said weight is inhibited.

9. In an erector system for vertical axis gyroscopes, a support rotatable on an axis extending in the same direction as the gyroscope axis, a torsion pendulum having a center of suspension on the rotatable support and movable in a plane perpendicular to the gyroscope axis, means for rotating the support and pendulum at a speed substantially equal to the natural frequency of oscillation of the torsion pendulum, an abutment on the gyroscope spaced from said torsion pendulum and means responsive to a predetermined force acting on the torsion pendulum in a direction substantially parallel to the axis of the gyroscope for causing the pendulum to engage the abutment for damping the oscillations of said pendulum whereby the erecting function is inhibited.

10. In an erector system for vertical axis gyroscopes, a rotatable head driven to rotate on a vertical axis at a lower speed than the speed of rotation of the gyroscope rotor, a torsion pendulum supported coaxially with said head and connected thereto and having a period of oscillation harmonically related to the period of rotation of the head.

11. In an erector system for vertical axis gyroscopes a support rotatable on an axis extending in the same direction as the gyroscope axis, a torsion pendulum having a center of suspension coaxial with the rotatable support and movable in a plane perpendicular to the gyroscope axis, and means for rotating the support and pendulum at a speed substantially equal to the frequency of a harmonic of the period of double oscillation of the pendulum.

12. In an erector system for vertical axis gyroscopes a support rotatable on an axis extending in the same direction as the gyroscope axis, a torsion pendulum having a center of suspension coaxial with the rotatable support and movable in a plane perpendicular to the gyroscope axis, and means for rotating the support and pendulum at a speed substantially equal to the natural frequency of double oscillation of the torsion pendulum, said pendulum having an amplitude of substantially 180°.

13. In an erector system for vertical axis gyroscopes, a member rotatable on an axis extending in the same direction as the gyroscope axis, a torsion pendulum carried coaxially with said member and connected to be driven thereby and having a period of oscillation harmonically related to the period of rotation of the member and means operating automatically upon turning of a craft on which the gyroscope is carried to inhibit oscillation of the pendulum.

AUGUST RASPET.

REFERENCES CITED

The following references are of record in the file of this patent:

UNITED STATES PATENTS

| Number | Name | Date |
| --- | --- | --- |
| 2,159,118 | Alkan | May 23, 1939 |
| 2,351,619 | Kimball | June 20, 1944 |
| 2,439,418 | Davenport | Apr. 13, 1948 |

FOREIGN PATENTS

| Number | Country | Date |
| --- | --- | --- |
| 215,189 | Germany | Oct. 26, 1909 |